(12) United States Patent
Hokoi et al.

(10) Patent No.: US 9,132,833 B2
(45) Date of Patent: Sep. 15, 2015

(54) HYBRID VEHICLE

(71) Applicants: Koji Hokoi, Toyota (JP); Makoto Hirai, Suntou-gun (JP)

(72) Inventors: Koji Hokoi, Toyota (JP); Makoto Hirai, Suntou-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/221,474

(22) Filed: Mar. 21, 2014

(65) Prior Publication Data

US 2014/0288743 A1    Sep. 25, 2014

(30) Foreign Application Priority Data

Mar. 25, 2013    (JP) ................... 2013-061933

(51) Int. Cl.
*B60W 20/00* (2006.01)
*B60W 10/06* (2006.01)
*B60W 10/08* (2006.01)
*B60W 10/26* (2006.01)
*B60K 6/445* (2007.10)

(52) U.S. Cl.
CPC .............. *B60W 20/40* (2013.01); *B60W 10/06* (2013.01); *B60W 10/08* (2013.01); *B60W 10/26* (2013.01); *B60W 20/104* (2013.01); *B60W 20/106* (2013.01); *B60K 6/445* (2013.01); *B60W 2510/244* (2013.01); *B60W 2530/12* (2013.01); *B60W 2710/248* (2013.01); *B60Y 2300/474* (2013.01); *Y02T 10/6239* (2013.01); *Y02T10/6265* (2013.01); *Y02T 10/6286* (2013.01); *Y02T 10/7077* (2013.01); *Y10S 903/93* (2013.01)

(58) Field of Classification Search
CPC ..... B60W 10/00; B60W 10/06; B60W 10/08; B60W 10/24; B60W 10/26; B60W 20/00; B60W 20/104; B60W 20/106; B60W 20/108; B60W 20/1086; B60W 20/40; B60W 2530/12; B60W 2530/14; B60W 2530/145; B60Y 2300/474; Y02T 10/62; Y02T 10/6286; Y02T 10/6291; Y10S 903/00; Y10S 903/93
USPC ............. 701/1, 22, 36, 51, 53, 54, 58, 65, 70, 701/93, 94, 117, 123, 400, 408, 409, 410, 701/411, 414, 423, 424, 425; 340/988, 340/995.1, 995.14, 995.19, 995.27; 180/170, 65.1, 65.21, 65.225, 65.235, 180/65.25, 65.265, 65.275, 65.28, 65.285, 180/65.29
See application file for complete search history.

(56) References Cited

U.S. PATENT DOCUMENTS

| 6,697,717 B2 * | 2/2004 | Shioda et al. ................... 701/22 |
| 2007/0029121 A1 * | 2/2007 | Saitou et al. ................ 180/65.2 |
| 2010/0161166 A1 * | 6/2010 | Yamada et al. ................ 701/22 |

FOREIGN PATENT DOCUMENTS

| JP | 2007-176392 A | 12/2007 |
| JP | 2010-042700 A | 2/2010 |
| JP | 2012-171520 A | 9/2012 |

*Primary Examiner* — Thomas Tarcza
*Assistant Examiner* — Edward Pipala
(74) *Attorney, Agent, or Firm* — Kenyon & Kenyon LLP (57) ABSTRACT

A hybrid vehicle includes an engine including a purification device, a motor, a battery, a navigation system, and a controller. The controller is configured to set a predetermined section, which is an initial section of a hybrid traveling priority section in a travel plan, for a warm-up section for warming up the purification device. The controller is configured to reset the travel plan by changing any one of an electric traveling priority sections before the predetermined section to the hybrid traveling priority section when a traveling load of the predetermined section is higher than a predetermined load corresponding to an output limit of the battery. The controller is configured to reset the section changed to the hybrid traveling priority section for the warm-up section for warming up the purification device.

5 Claims, 7 Drawing Sheets

HYBRID VEHICLE

INCORPORATION BY REFERENCE

The disclosure of Japanese Patent Application No. 2013-061933 filed on Mar. 25, 2013 including the specification, drawings and abstract is incorporated herein by reference in its entirety.

BACKGROUND OF THE INVENTION

1. Field of the Invention

The invention relates to a hybrid vehicle and, more particularly, to a hybrid vehicle including an engine that is able to output driving power and to which a purification device having a purification catalyst for purifying exhaust gas is connected, a motor that is able to output driving power, a battery that is able to exchange electric power with the motor, and a navigation system that sets a travel route to a destination and carries out route guidance.

2. Description of Related Art

A hybrid vehicle includes a motor generator and an engine that drive wheels. The hybrid vehicle executes control for switching between an EV mode and an HV mode. In the EV mode, the vehicle is caused to travel in a state where the engine is stopped. In the HV mode, the vehicle is caused to travel in a state where the engine is operated. The timing of switching from the EV mode to the HV mode is predicted on the basis of information from an in-vehicle car navigation system, an ETC in-vehicle device, or the like, and then, for example, the engine is warmed up and a catalyst device for purifying exhaust gas from the engine is preheated in advance of the predicted timing (for example, see Japanese Patent Application Publication No. 2007-176392 (JP 2007-176392A)). In this hybrid vehicle, deterioration of fuel economy and emissions is suppressed through the above process.

SUMMARY OF THE INVENTION

When a destination has been set by a driver, the hybrid vehicle sets a travel plan by setting one of an EV (priority) mode and an HV (priority) mode for each of travel sections in a travel route to the destination on the basis of a traveling load. The hybrid vehicle that travels in accordance with the travel plan needs to reset the travel plan each time in order to apply the above-described control.

A hybrid vehicle according to the invention reduces the number of times the travel plan is reset.

An aspect of the invention provides a hybrid vehicle. The hybrid vehicle includes an engine, a motor, a battery, a navigation system, and a controller. The engine is configured to output driving power. The engine includes a purification device having a purification catalyst that purifies exhaust gas. The purification device is installed in an exhaust system. The motor is configured to output driving power. The battery is configured to exchange electric power with the motor. The navigation system is configured to set a travel route to a destination and carry out route guidance. The controller is configured to set a travel plan in which each of travel sections in the travel route to the destination, set by the navigation system, is determined as one of a hybrid traveling priority section and an electric traveling priority section on the basis of a traveling load. The hybrid traveling priority section is a section in which hybrid traveling in which the hybrid vehicle travels while the engine is operated is carried out in preference to electric traveling in which the hybrid vehicle travels while operation of the engine is stopped. The electric traveling priority section is a section in which the electric traveling is carried out in preference to the hybrid traveling. The controller is configured to set a predetermined section, which is an initial section of the hybrid traveling priority section in the travel plan, for a warm-up section for warming up the purification device. The controller is configured to reset the travel plan by changing any one of the electric traveling priority sections before the predetermined section to the hybrid traveling priority section when the traveling load of the predetermined section is higher than a predetermined load corresponding to an output limit of the battery. The controller is configured to reset the section changed to the hybrid traveling priority section for the warm-up section for warming up the purification device. The controller is configured to keep the travel plan and the warm-up section of the purification device when the traveling load of the predetermined section is lower than or equal to the predetermined load. The controller is configured to control the engine and the motor such that the purification device is warmed up when the hybrid vehicle travels on the driving power and travels in the warm-up section for warming up the purification device in accordance with the set travel plan.

With the hybrid vehicle according to the aspect of the invention, the travel plan is set such that each of the travel sections in the travel route to the destination, supplied from the navigation system, is determined as one of the hybrid traveling priority section and the electric traveling priority section on the basis of the traveling load. The hybrid traveling priority section is a section in which hybrid traveling in which the vehicle travels while the engine is operated is carried out in preference to electric traveling in which the vehicle travels while operation of the engine is stopped, and the electric traveling priority section is a section in which the electric traveling is carried out in preference to the hybrid traveling. The predetermined section, which is the initial hybrid traveling priority section in the travel plan, is set for the warm-up section for warming up the purification device. The travel plan is reset by changing any one of the electric traveling priority sections before the predetermined section to the hybrid traveling priority section when the traveling load of the predetermined section is higher than the predetermined load corresponding to the output limit of the battery. The changed section is reset for the warm-up section for warming up the purification device. The travel plan and the warm-up section for warming up the purification device are kept when the traveling load of the predetermined section is lower than or equal to the predetermined load. The engine and the motor are controlled such that the purification device is warmed up when the vehicle travels on the driving power and travels in the warm-up section for warming up the purification device in accordance with the set travel plan. Thus, when the traveling load of the predetermined section is higher than the predetermined load, it is possible to warm up the purification catalyst when the vehicle travels in the changed section before the predetermined section (travel section having a relatively low traveling load), so it is possible to suppress deterioration of emissions when the vehicle travels in the predetermined section. When the traveling load of the predetermined section is lower than the predetermined load, the travel plan is not reset, so it is possible to reduce the number of times of resetting. Thus, the load of the travel plan resetting process on the controller reduces.

In the hybrid vehicle according to the aspect of the invention, the controller may be configured to limit the driving power to at or below the output limit of the battery when the hybrid vehicle travels in the warm-up section for warming up the purification device. Thus, it is possible to suppress stop and interruption of operation of the engine for warming up the purification catalyst. In the hybrid vehicle according to the aspect of the invention, the controller may be configured not to limit the driving power to at or below the output limit of the battery when an accelerator operation amount is larger than a, predetermined operation amount while the hybrid vehicle travels in the warm-up section for warming up the purification device. Thus, it is possible to deal with driver's request for rapid acceleration.

In the hybrid vehicle according to the aspect of the invention, the controller may be configured to determine the travel sections until a total energy of the electric traveling priority sections reaches a stored electric energy of the battery as the electric traveling priority sections in ascending order of a traveling load for the travel sections having the traveling load lower than or equal to the predetermined load among the travel sections in the travel route. The controller may be configured to determine a remaining travel sections among the travel sections having the traveling load lower than or equal to the predetermined load as the hybrid traveling priority sections. The controller may be configured to determine the travel sections having the traveling load higher than the predetermined load as the hybrid traveling priority sections.

The hybrid vehicle according to the aspect of the invention may further include: a generator; and a planetary gear unit connected to a drive shaft coupled to an axle, an output shaft of the engine and a rotary shaft of the generator, wherein the motor may be connected to the drive shaft.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described.

Figure 1:
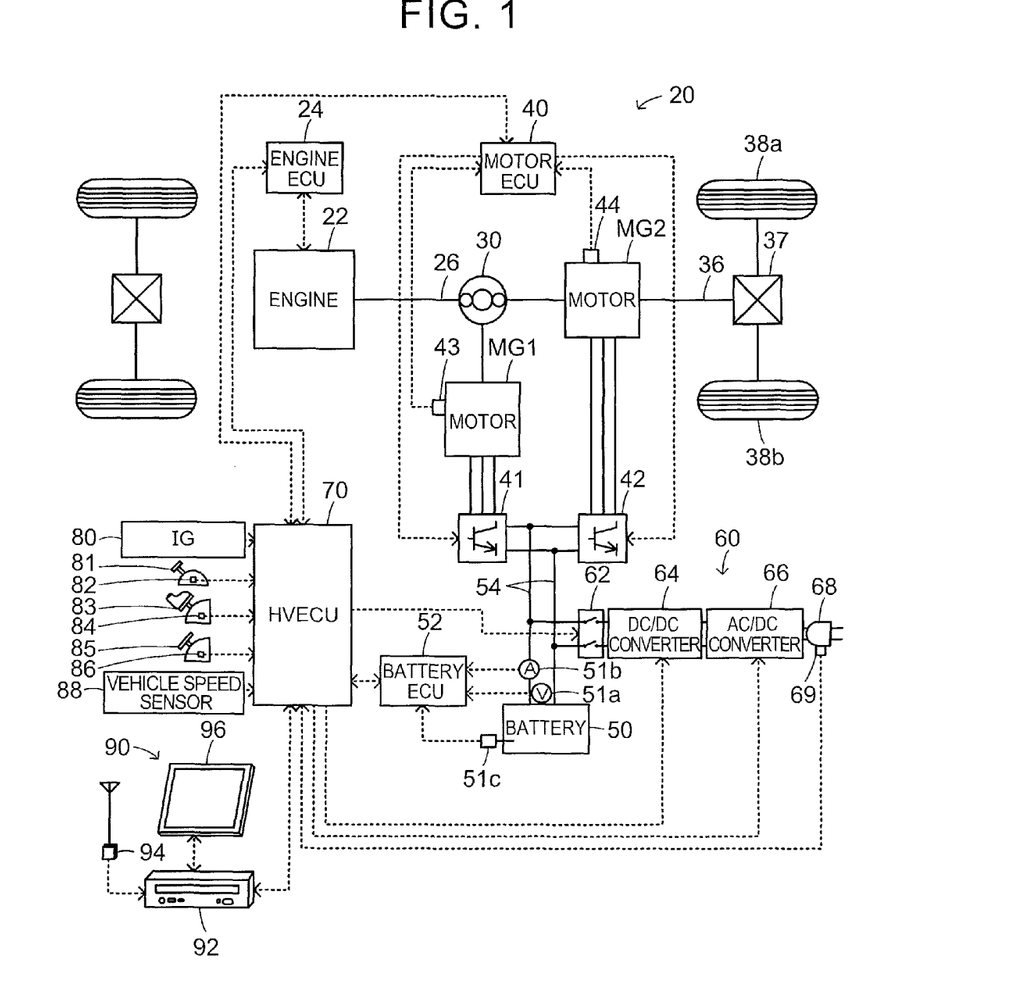
FIG. 1 is a configuration view that schematically shows the configuration of a hybrid vehicle according to an embodiment of the invention.
Figure 2:
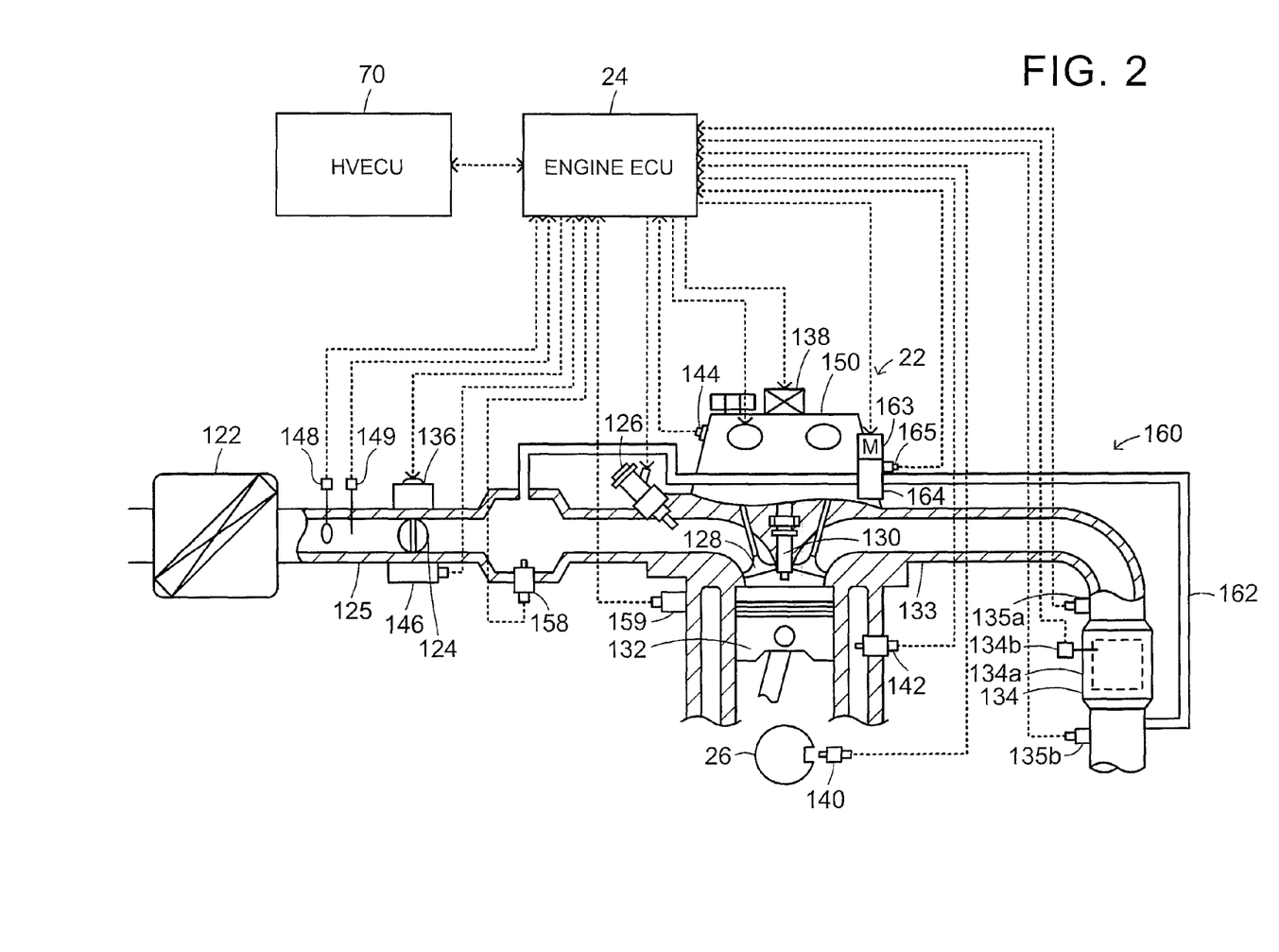
FIG. 2 is a configuration view that schematically shows the configuration of an engine.

FIG. 1 is a configuration view that schematically shows the configuration of a hybrid vehicle 20 according to the embodiment of the invention. FIG. 2 is a configuration view that schematically shows the configuration of an engine 22. As shown in the drawing, the hybrid vehicle 20 according to the embodiment includes an engine 22, an engine electronic control unit (hereinafter, referred to as engine ECU) 24, a planetary gear unit 30, a motor MG1, a motor MG2, inverters 41, 42, a motor electronic control unit (hereinafter, referred to as motor ECU) 40, a battery 50, a battery electronic control unit (hereinafter, referred to as battery ECU) 52, a charger 60, a navigation system 90 and a hybrid electronic control unit (hereinafter, referred to as HVECU) 70. The engine 22 outputs power by using gasoline, light oil, or the like, as fuel. The engine ECU 24 executes drive control over the engine 22. In the planetary gear unit 30, a carrier is connected to a crankshaft 26 of the engine 22, and a ring gear is connected to a drive shaft 36 coupled to drive wheels 38a, 38b via a differential gear 37. The motor MG1 is, for example, configured as a synchronous generator motor, and a rotor of the motor MG1 is connected to a sun gear of the planetary gear unit 30. The motor MG2 is, for example, configured as a synchronous generator motor, and a rotor of the motor MG2 is connected to the drive shaft 36. The inverters 41, 42 are respectively used to drive the motors MG1, MG2. The motor ECU 40 executes drive control over the motors MG1, MG2 by executing switching control over switching elements (not shown) of the inverters 41, 42. The battery 50 is, for example, configured as a lithium ion secondary battery, and exchanges electric power with the motors MG1, MG2 via the inverters 41, 42. The battery ECU 52 manages the battery 50. The charger 60 is connected to an external power supply, such as a domestic power supply, and is able to charge the battery 50. The navigation system 90 sets a travel route and carries out route guidance when a destination is set by a driver. The HVECU 70 controls the vehicle overall.

As shown in FIG. 2, the engine 22 introduces air, purified by an air cleaner 122, via a throttle valve 124. Fuel is injected from a fuel injection valve 126, and the introduced air is mixed with the fuel. The air-fuel mixture is introduced into a combustion chamber via an intake valve 128. The air-fuel mixture is exploded and combusted by electric spark generated by an ignition plug 130. The reciprocal motion of a piston 132 that is pushed downward by the energy of explosion and combustion is converted to the rotation motion of the crankshaft 26. Exhaust gas from the engine 22 is emitted to outside air via a purification device 134. The purification device 134 includes a purification catalyst (three-way catalyst) 134a that purifies toxic substances including carbon monoxide (CO), hydrocarbons (HC) and nitrogen oxides (NOx). Exhaust gas is supplied to an intake pipe 125 via an exhaust gas recirculation system (hereinafter, referred to as EGR system) 160. The EGR system 160 recirculates exhaust gas to intake air. The EGR system 160 includes an EGR pipe 162. The EGR pipe 162 connects the downstream side of an exhaust pipe 133 of the engine 22 with respect to the purification device 134 to the intake pipe 125, and is used to supply exhaust gas to a surge tank of the intake pipe 125. The EGR system 160 also includes an EGR valve 164 arranged in the EGR pipe 162. The EGR system 160 recirculates exhaust gas to the intake pipe 125 by regulating the recirculation amount of exhaust gas as unburned gas. The recirculation amount of exhaust gas is adjusted by adjusting the opening degree of the EGR valve 164. The engine 22 introduces a gaseous mixture of air, exhaust gas and gasoline into the combustion chamber in this way. Hereinafter, recirculating exhaust gas of the engine 22 to the intake pipe 125 is termed EGR, exhaust gas that is recirculated from the exhaust pipe 133 of the engine 22 to the intake pipe 125 is termed EGR gas, and the flow rate of the EGR gas is termed EGR amount Vegr.

Although not shown in the drawing, the engine ECU 24 is configured as a microprocessor mainly formed of a CPU. In addition to the CPU, the microprocessor includes a ROM that stores a processing program, a RAM that temporarily stores data, input/output ports and a communication port. Signals from various sensors that detect the state of the engine 22 are input to the engine ECU 24 via the input port. Examples of the signals include a crank position $\theta cr$, a coolant temperature Tw, an in-cylinder pressure Pin, a cam angle $\theta ca$, a throttle opening degree TH, an intake air amount Qa, an intake air temperature Ta, an intake air pressure Pa, a knock signal Ks, a catalyst temperature Tc, an air-fuel ratio AF, an oxygen signal O2, an EGR valve opening degree EV, and the like. The crank position $\theta cr$ is transmitted from a crank position sensor 140 that detects the rotation position of the crankshaft 26. The coolant temperature Tw is transmitted from a coolant temperature sensor 142 that detects the temperature of coolant of the engine 22. The in-cylinder pressure Pin is transmitted from a pressure sensor installed in the combustion chamber. The cam angle $\theta ca$ is transmitted from a cam position sensor 144 that detects the rotation position of a camshaft that opens or closes the intake valve 128 for introducing air into the combustion chamber or an exhaust valve for emitting exhaust gas from the combustion chamber. The throttle opening degree TH is transmitted from a throttle valve position sensor 146 that detects the position of the throttle valve 124. The intake air amount Qa is transmitted from an air flow meter 148 installed in the intake pipe 125. The intake air temperature Ta is transmitted from a temperature sensor 149 installed similarly in the intake pipe 125. The intake air pressure Pa is transmitted from a pressure sensor that detects the pressure in the intake pipe 125. The knock signal Ks transmitted from a knock sensor 159 that is installed at a cylinder block and that detects vibrations arising as a result of generation of knocking. The catalyst temperature Tc is transmitted from a temperature sensor 134b that detects the temperature of the purification catalyst 134a of the purification device 134. The air-fuel ratio AF is transmitted from an air-fuel ratio sensor 135a installed in the exhaust pipe 133 at a portion upstream of the purification device 134. The oxygen signal O2 is transmitted from an oxygen sensor 135b installed in the exhaust pipe 133 at a portion downstream of the purification device 134. The EGR valve opening degree EV is transmitted from an EGR valve opening degree sensor 165 that detects the opening degree of the EGR valve 164. Various control signals for driving the engine 22 are output from the engine ECU 24 via the output port. Examples of the various control signals include a drive signal to the fuel injection valve 126, a drive signal to a throttle motor 136 that adjusts the position of the throttle valve 124, a control signal to an ignition coil 138 integrated with an igniter, a control signal to a variable valve timing mechanism 150 that is able to change the open/close timing of the intake valve 128, a control signal to a stepping motor 163 that adjusts the opening degree of the EGR valve 164, and the like. The engine ECU 24 communicates with the HVECU 70, executes operation control over the engine 22 in accordance with a control signal from the HVECU 70, and, where necessary, outputs data about the operating state of the engine 22. The engine ECU 24 computes the rotation speed of the crankshaft 26, that is, the rotation speed Ne of the engine 22, on the basis of the crank position $\theta cr$ from the crank position sensor 140. The engine ECU 24 computes a volumetric efficiency (the ratio of the volume of air that is actually introduced per one cycle to a piston displacement of the engine 22 per one cycle) KL on the basis of the intake air amount Qa from the air flow meter 148 and the rotation speed Ne of the engine 22. The engine ECU 24 computes the open/close timing VT of the intake valve 128 on the basis of an angle ($\theta ci - \theta cr$) of the cam angle $\theta ci$ of an intake camshaft for the intake valve 128, transmitted from the cam position sensor 144, with respect to the crank angle $\theta cr$ transmitted from the crank position sensor 140. The engine ECU 24 computes a knock intensity Kr indicating the level of knocking on the basis of the magnitude and waveform of the knock signal Ks from the knock sensor 159. The engine ECU 24 computes an EGR ratio Regr on the basis of the intake air amount Qa from the air flow meter 148, the EGR valve opening degree EV from the EGR valve opening degree sensor 165 and the rotation speed Ne of the engine 22. The EGR ratio Regr is the ratio of the EGR amount Vegr to the sum of the EGR amount and the intake air amount Qa of the engine 22.

Although not shown in the drawing, the motor ECU 40 is configured as a microprocessor mainly formed of a CPU. In addition to the CPU, the microprocessor includes a ROM that stores a processing program, a RAM that temporarily stores data, input/output ports and a communication port. Signals required to execute drive control over the motors MG1, MG2 are input to the motor ECU 40 via the input port. Examples of the signals include rotation positions $\theta m1$, $\theta m2$ from rotation position detection sensors 43, 44 that respectively detect the rotation positions of the rotors of the motors MG1, MG2, phase currents that are fed to the motors MG1, MG2 and detected by a current sensor (not shown), and the like. Switching control signals to the switching elements (not shown) of the inverters 41, 42, and the like, are output from the motor ECU 40 via the output port. The motor ECU 40 communicates with the HVECU 70, executes drive control over the motors MG1, MG2 in accordance with a control signal from the HVECU 70, and, where necessary, outputs data about the operating states of the motors MG1, MG2 to the HVECU 70. The motor ECU 40 computes rotation angular velocities $\omega m1$, $\omega m2$ and rotation speeds Nm1, Nm2 of the motors MG1, MG2 on the basis of the rotation positions $\theta m1$, $\theta m2$ of the rotors of the motors MG1, MG2 from the rotation position detection sensors 43, 44.

Although not shown in the drawing, the battery ECU 52 is configured as a microprocessor mainly formed of a CPU. In addition to the CPU, the microprocessor includes a ROM that stores a processing program, a RAM that temporarily stores data, input/output ports and a communication port. Signals required to manage the battery 50 are input to the battery ECU 52. Examples of the signals include a terminal voltage Vb from a voltage sensor 51a provided between the terminals of the battery 50, a charging/discharging current Ib from a current sensor 51b provided in a power line connected to the output terminal of the battery 50, a battery temperature Tb from the temperature sensor 51c installed on the battery 50, and the like. Where necessary, the battery ECU 52 transmits data about the state of the battery 50 to the HVECU 70 through communication. In order to manage the battery 50, the battery ECU 52 computes the state of charge SOC that is the percentage of the amount of electric power dischargeable from the battery 50 at that time with respect to the full capacity on the basis of an accumulated value of the charging/ discharging current Ib detected by the current sensor 51b. The battery ECU 52 computes input/output limits Win, Wout that are allowable input/output powers on the basis of the computed state of charge SOC and the battery temperature Tb. The battery 50 may be charged or discharged at the allowable input/output powers. The battery ECU 52 sets basic values of the input/output limits Win, Wout on the basis of the battery temperature Tb. The battery ECU 52 sets an output limit correction coefficient and an input limit correction coefficient on the basis of the state of charge SOC of the battery 50. The battery ECU 52 sets the input/output limits Win, Wout of the battery 50 by multiplying the set basic values of the input/output limits Win, Wout by the respective correction coefficients.

The charger 60 is connected via a relay 62 to a power line 54 that connects the inverters 41, 42 to the battery 50. The charger 60 includes an AC/DC converter 66 and a DC/DC converter 64. The AC/DC converter 66 converts alternating-current power, supplied from an external power supply via a power plug 68, to direct-current power. The DC/DC converter 64 converts the voltage of direct-current power from the AC/DC converter 66, and supplies the direct-current power to the power line 54.

The navigation system 90 includes a main body 92, a GPS antenna 94 and a touch panel display 96. The main body 92 incorporates a control unit that includes a storage medium, input/output ports, a communication port, and the like. The storage medium is, for example, a hard disk in which map information, and the like, are stored. The GPS antenna 94 receives information about the current location of the vehicle. The display 96 displays various pieces of information, such as information about the current location of the vehicle and a travel route to a destination, and allows an operator to input various instructions. Service information (for example, tourist information, a parking area, or the like), road information for each predetermined travel section (for example, a section between traffic signals, a section between intersections, or the like), and the like, are stored in the map information in a database. The road information contains distance information, width information, region information (urban or suburban), category information (ordinary road, highway), gradient information, legal speed, the number of traffic signals, and the like. When a destination has been set by an operator, the navigation system 90 makes a search for a travel route from the current location of the vehicle to the destination on the basis of the map information, the current location of the vehicle and the destination. The navigation system 90 outputs the found travel route to the display 96, and carries out route guidance.

The HVECU 70 is configured as a microprocessor mainly formed of a CPU 72. In addition to the CPU 72, the microprocessor includes a ROM 74 that stores a processing program, a RAM 76 that temporarily stores data, a flash memory 78 that stores and holds data, input/output ports and a communication port. A connection detection signal, an ignition signal, a shift position SP, an accelerator operation amount Acc, a brake pedal position BP, a vehicle speed V, and the like, are input to the HVECU 70 via the input port. The connection detection signal is supplied from a connection detection sensor 69 that detects connection of the power plug 68 to the external power supply. The ignition signal is supplied from an ignition switch 80. The shift position SP is supplied from a shift position sensor 82 that detects the operating position of a shift lever 81. The accelerator operation amount Acc is supplied from an accelerator pedal position sensor 84 that detects the depression amount of an accelerator pedal 83. The brake pedal position BP is supplied from a brake pedal position sensor 86 that detects the depression amount of a brake pedal 85. The vehicle speed V is supplied from a vehicle speed sensor 88. An on/off signal to the relay 62, control signals to the DC/DC converter 64 and the AC/DC converter 66, and the like, are output from the HVECU 70 via the output port. As described above, the HVECU 70 is connected to the engine ECU 24, the motor ECU 40, the battery ECU 52 and the navigation system 90 via the communication port, and exchanges various control signals and data with the engine ECU 24, the motor ECU 40, the battery ECU 52 and the navigation system 90.

The thus configured hybrid vehicle 20 according to the embodiment travels in hybrid traveling (HV traveling) in which the vehicle travels while the engine 22 is operated or travels in electric traveling (EV traveling) in which the vehicle travels while the operation of the engine 22 is stopped.

When the purification catalyst 134a is activated (when the catalyst temperature Tc is higher than or equal to a catalyst activation temperature Tcref while the vehicle travels in HV traveling, the HVECU 70 sets a required torque Tr* that is required for the vehicle to travel on the basis of the accelerator operation amount Acc from the accelerator pedal position sensor 84 and the vehicle speed V from the vehicle speed sensor 88, calculates a driving power Pdrv* that is required for the vehicle to travel by multiplying the set required torque Tr* by the rotation speed Nr of the drive shaft 36 (for example, a rotation speed obtained by multiplying the rotation speed Nm2 of the motor MG2 or the vehicle speed V by a conversion coefficient), and sets a required power Pe* that is required for the vehicle by subtracting a charging/discharging required power Pb* of the battery 50 (a positive value when the battery 50 is discharged) based on the state of charge SOC of the battery 50 from the calculated driving power Pdrv*. The HVECU 70 sets a target rotation speed Ne* and target torque Te* of the engine 22 by using an operation line (for example, an optimal fuel economy operation line) as the correlation between the rotation speed Ne and torque Te of the engine 22, at which it is possible to efficiently output the required power Pe* from the engine 22, sets a torque command Tm1* of the motor MG1 through rotation speed feedback control such that the rotation speed Ne of the engine 22 becomes the target rotation speed Ne* within the range of the input/output limits Win, Wout of the battery 50, sets a torque command Tm2* of the motor MG2 by subtracting a torque, which acts on the drive shaft 36 via the planetary gear unit 30 when the motor MG1 is driven at the torque command Tm1*, from the required torque Tr*, transmits the set target rotation speed Ne* and the set target torque Te* to the engine ECU 24, and transmits the set torque commands Tm1*, Tm2* to the motor ECU 40. The engine ECU 24 that has received the target rotation speed Ne* and the target torque Te* executes intake air amount control, fuel injection control, ignition control, and the like, over the engine 22 such that the engine 22 is operated at the target rotation speed Ne* and the target torque Te*. The motor ECU 40 that has received the torque commands Tm1*, Tm2* executes switching control over the switching elements of the inverters 41, 42 such that the motors MG1, MG2 are respectively driven at the torque commands Tm1*, Tm2*. Through such control, the vehicle is able to travel by outputting the required torque Tr* (driving power Pdrv*) to, the drive shaft 36 within the range of the input/output limits Win, Wout of the battery 50 while efficiently operating the engine 22. While the vehicle travels in this HV traveling, when a condition for stopping the engine 22, such as when the required power Pe* becomes lower than a start/stop threshold Pref (described later), the vehicle stops the operation of the engine 22 and travels in EV traveling.

When the purification catalyst 134a is not activated (when the catalyst temperature Tc is lower than the catalyst activation temperature Tcref) while the vehicle travels in HV traveling, the vehicle continues traveling in HV traveling until the purification catalyst 134a is activated. When the driving power Pdrv* is lower than or equal to the output limit Wout of the battery 50, the HVECU 70 sets a catalyst warm-up power Pset for the required power Pe*, sets the target rotation speed Ne* and target torque Te* of the engine 22 and the torque commands Tm1*, Tm2* of the motors MG1, MG2 and transmits the set target rotation speed Ne*, target torque Te*and torque commands Tm1*, Tm2* to the engine ECU 24 and the motor ECU 40 as in the case where the purification catalyst 134a is activated. In this case, the engine ECU 24 carries out ignition at the ignition timing later than the ignition timing for efficiently operating the engine 22 and suitable for catalyst warm-up in ignition control. Through such control, it is possible to carry out catalyst warm-up (operate the engine 22 at a catalyst warm-up operation point). On the other hand, when the driving power Pdrv* is higher than the output limit Wout of the battery 50, the HVECU 70 sets a power (Pdrv*−Wout) obtained by subtracting the output limit Wout of the battery 50 from the driving power Pdrv* for the required power Pe*, sets the target rotation speed Ne* and target torque Te* of the engine 22 and the torque commands Tm1*, Tm2* of the motors MG1, MG2 and transmits the set target rotation speed Ne*, target torque Te*and torque commands Tm1*, Tm2* to the engine ECU 24 and the motor ECU 40 as in the case where the purification catalyst 134a is activated. Through control, it is possible to suppress deterioration of emissions in comparison with the case where the required power Pe*(=Tr*·Nr−Pb*) similar to that when the purification catalyst 134a is activated is used.

While the vehicle is traveling in EV traveling, the HVECU 70 sets the required torque Tr* on the basis of the accelerator operation amount Acc and the vehicle speed V, sets value "0" for the torque command Tm1* of the motor MG1, sets the torque command Tm2* of the motor MG2 such that it is possible to output the required torque Tr* to the drive shaft 36 within the range of the input/output limits Win, Wout of the battery 50, and transmits the set torque command Tm2* to the motor ECU 40. The motor ECU 40 that has received the torque commands Tm1*, Tm2* executes switching control over the switching elements of the inverters 41, 42 such that the motors MG1, MG2 are respectively driven at the torque commands Tm1*, Tm2*. Through such control, the vehicle is able to travel by outputting the required torque Tr* (driving power Pdrv*) to the drive shaft 36 within the range of the input/output limits Win, Wout of the battery 50 in a state where the operation of the engine 22 is stopped through such control. While the vehicle is traveling in this EV traveling, as well as while the vehicle is traveling in HV traveling, when a condition for starting the engine 22, such as when the calculated required power Pe* becomes higher than or equal to a start/stop threshold Pref, the vehicle starts the engine 22 and travels in HV traveling.

In the hybrid vehicle 20 according to the embodiment, when the vehicle is caused to stop its system at home or at a preset charging point, then the power plug 68 is connected to the external power supply and the connection has been detected by the connection detection sensor 69, the HVECU 70 turns on the relay 62, and charges the battery 50 with electric power from the external power supply by controlling the DC/DC converter 64 or the AC/DC converter 66 to a predetermined state of charge (for example, 80%, 85%, 90%, or the like) determined as a fully charged state or a state of charge slightly lower than the fully charged state. When the system has been started up after charging of the battery 50, unless a destination is set by a driver, the HVECU 70, the engine ECU 24 and the motor ECU 40 cause the vehicle to travel in an EV traveling priority mode in which EV traveling is carried out in preference to HV traveling until the state of charge of the battery 50 becomes lower than or equal to a threshold Shy (for example, 20%, 25%, 30%, or the like) set to a value such that the state of charge SOC of the battery 50 allows starting of the engine 22, and cause the vehicle to travel in an HV traveling priority mode in which HV traveling is carried out in preference to EV traveling after the state of charge SOC of the battery 50 becomes lower than or equal to the threshold Shv.

In the embodiment, the output limit Wout of the battery 50 is set for the start/stop threshold Pref at the time of traveling in the EV traveling priority mode, and a value close to the lower limit of the required power Pe* (value sufficiently lower than the output limit Wout) at which it is possible to efficiently operate the engine 22 is set for the start/stop threshold Pref at the time of traveling in the HV traveling priority mode. Thus, the engine 22 is made hard to be started at the time of traveling in the EV traveling priority mode (the vehicle is caused to tend to travel in EV traveling), and the engine 22 is made hard to be stopped at the time of traveling in the HV traveling priority mode (the vehicle is caused to tend to travel in HV traveling).

In addition, in the hybrid vehicle 20 according to the embodiment, when a destination has been set by the driver, the HVECU 70 sets a travel plan by determining each of the travel sections of a travel route to the destination, supplied from the navigation system 90, as one of an HV traveling priority section in which the vehicle travels in the HV traveling priority mode and an EV traveling priority section in which the vehicle travels in the EV traveling priority mode. The details of setting of the travel plan will be described later. The HVECU 70, the engine ECU 24 and the motor ECU 40 cause the vehicle to travel in one of the HV traveling priority mode and the EV traveling priority mode in accordance with the travel plan.

Figure 3:
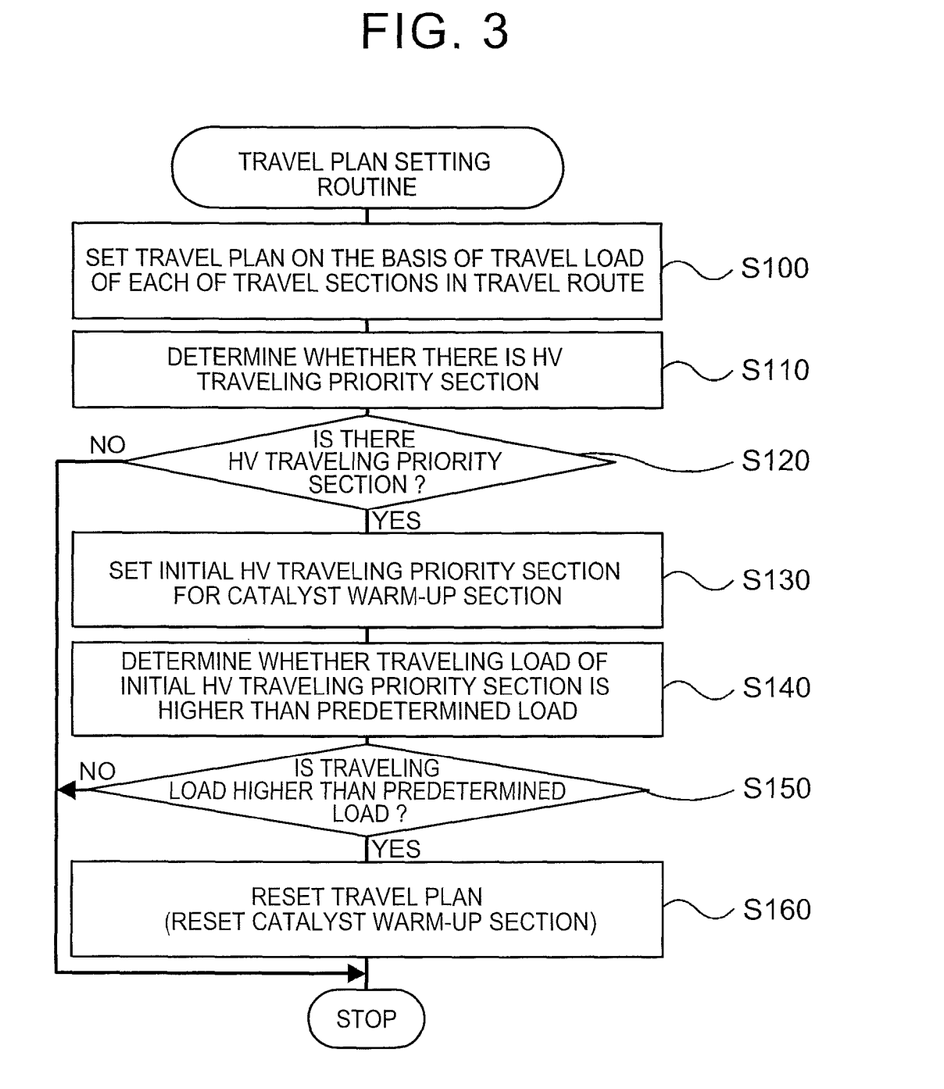
FIG. 3 is a flowchart that illustrates an example of a travel plan setting routine that is executed by an HVECU according to the embodiment.

Next, the operation of the thus configured hybrid vehicle 20 according to the embodiment and the operation at the time of setting a travel plan for a travel route to a destination will be described. FIG. 3 is a view that illustrates an example of a travel plan setting routine that is executed by the HVECU 70 according to the embodiment. This routine is executed at the time when a travel route to a destination and map information (distance information, gradient information, and the like) about each of the travel sections of the travel route, supplied from the navigation system 90, have been received.

When the travel plan setting routine is executed, the HVECU 70 initially sets the travel plan for the travel route from the current location to the destination by determining each of the travel sections in the travel route as one of the HV traveling priority section in which the vehicle travels in the HV traveling priority mode and the EV traveling priority section in which the vehicle travels in the EV traveling priority mode on the basis of a traveling load (step S100).

In the embodiment, the travel plan is set as follows. For travel sections having a traveling load lower than or equal to a predetermined load corresponding to the output limit Wout of the battery 50, Travel sections until the total required energy of the EV traveling priority sections reaches the stored electric energy of the battery 50 are determined as the EV traveling priority sections in ascending order of a traveling load and the remaining travel sections are determined as the HV traveling priority sections. Travel sections having a traveling load higher than the predetermined load among the travel sections are determined as the HV traveling priority sections. Here, the traveling load is, for example, set so as to increase when a road surface gradient increases as an uphill road with respect to a traveling direction on the basis of the map information (such as distance information and gradient information) of each travel section, supplied from the navigation system 90. The required energy of each travel section may be set on the basis of an accumulated value of the traveling load in distance, the product of the average of the traveling load and the distance, or the like. In addition, the stored electric energy of the battery 50 may be set as the product of the state of charge SOC of the battery 50 and the total capacity.

When the travel plan for the travel route from the current location to the destination is set in this way, it is determined whether there is an HV traveling priority section in the set travel plan (step S110, step S120). When it is determined that there is no HV traveling priority section, the routine directly ends. In this case, when the vehicle starts traveling, the vehicle travels in the EV traveling priority mode to the destination.

When it has been determined in step S110, step S120 that there is an HV traveling priority section, a predetermined section that is the initial HV traveling priority section in the travel plan is set as the catalyst warm-up section (step S130), and it is determined whether the traveling load of the predetermined section is higher than the predetermined load or lower than or equal to the predetermined load (step S140, step S150). When it has been determined that the traveling load of the predetermined section is higher than the predetermined load, the travel plan is reset by changing any one of the travel sections before the predetermined section to the HV traveling priority section (hereinafter, this travel section is referred to as changed section), and the changed section is reset for the catalyst warm-up section (step S160), after which the routine ends. Here, the changed section may be, for example, a travel section immediately before the predetermined section, a travel section having the lowest traveling load, or the like. Now it is assumed that the purification catalyst 134*a* is not activated at the time when the vehicle starts traveling with a set travel plan to a destination. At this time, when the engine 22 has been started for the first time thereafter, catalyst warm-up is desirably carried out. However, when the engine 22 is started for the first time in the predetermined section, a certain level of power (Pdrv*−Wout) is output from the engine 22 as described above although the purification catalyst 134*a* is not activated, so it is not desirable in terms of emissions. In contrast, in the embodiment, by changing any one of the travel sections (travel sections having a traveling load lower than or equal to the predetermined load) before the predetermined section is changed to the HV traveling priority section, it is possible to carry out catalyst warm-up at the time when the vehicle travels in the changed section (reset catalyst warm-up section), so it is possible to suppress deterioration of emissions at the time when the vehicle travels in the predetermined section.

When it has been determined in step S140, step S150 that the traveling load of the predetermined section is lower than or equal to the predetermined load, the routine directly ends. Thus, it is possible to reduce the number of times the travel plan is reset (the processing load of the HVECU 70). In this case, catalyst warm-up is carried out when the vehicle travels in the predetermined section.

Figure 4:
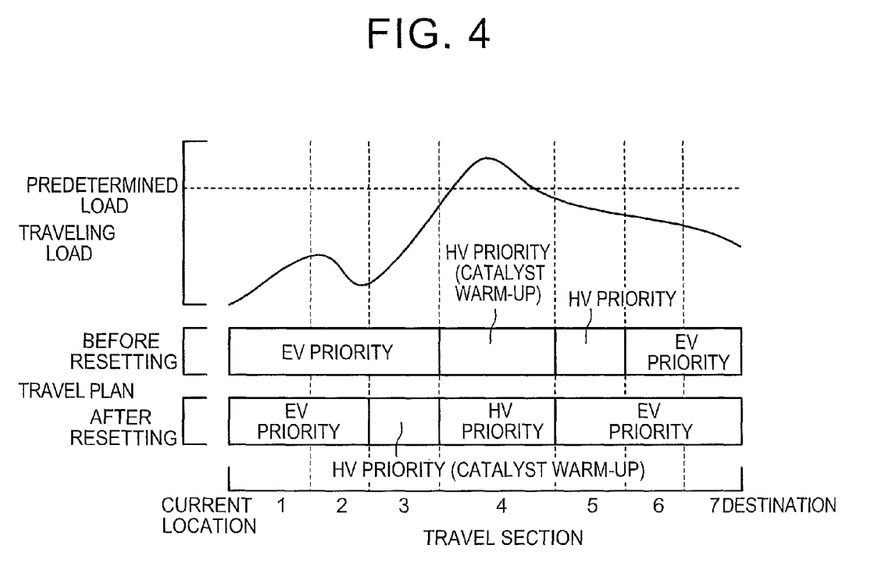
FIG. 4 is a graph that illustrates an example of a traveling load and a travel plan in a travel route from a current location to a destination.
Figure 5:
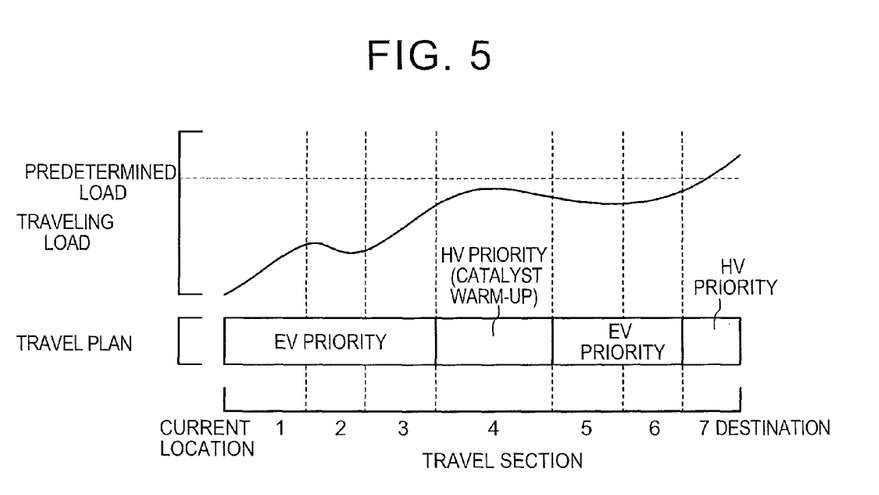
FIG. 5 is a graph that illustrates an example of a traveling load and a travel plan in a travel route from a current location to a destination.

FIG. 4 and FIG. 5 are graphs that illustrate examples of a traveling load and a travel plan in a travel route from a current location to a destination. In FIG. 4 and FIG. 5, the travel plan is set by determining each of travel sections 1 to 7 from the current location to the destination as one of the EV traveling priority section and the HV traveling priority section. In FIG. 4, initially, as shown in the travel plan (before resetting), for the travel sections 1 to 3, 5 to 7 having a traveling load lower than the predetermined load, the travel sections 1, 2, 3, 7, 6 are determined as the EV traveling priority sections in ascending order of a traveling load, the travel section 5 is determined as the HV traveling priority section, the travel section 4 having a traveling load (the average in the travel section) higher than the predetermined load is determined as the EV traveling priority section, thus setting the travel plan, and the travel section 4 is set for the catalyst warm-up section. In the thus set travel plan (before resetting), the traveling load of the travel section 4 as the initial HV traveling priority section (predetermined section) is higher than the predetermined load. Thus, as shown in the travel plan (after resetting), the travel plan is reset by changing the travel section 3 before the travel section 4 to the HV traveling priority section, and the travel section 3 is reset for the catalyst warm-up section. Thus, it is possible to carry out catalyst warm-up at the time when the vehicle travels in the travel section 3, so it is possible to suppress deterioration of emissions at the time when the vehicle travels in the travel section 4. As shown in the travel plan (after resetting), by changing the travel section 3 from the EV traveling priority section to the HV traveling priority section, the total required energy of the EV traveling priority section reduces, so the travel section 5 is changed to the EV traveling priority section at the time of resetting the travel plan. Thus, it is possible to suppress a reduction in travel distance in EV traveling. It is also applicable that the travel section 5 is not changed from the HV traveling priority section to the EV traveling priority section.

In FIG. 5, as shown in the travel plan, for the travel sections 1 to 6 having a traveling load lower than the predetermined load, the travel sections 1, 2, 3, 6, 5 are determined as the EV traveling priority sections in ascending order of a traveling load and the travel section 4 is determined as the HV traveling priority section, and the travel section 7 having a traveling load (the average of the travel section) higher than the predetermined load is determined as the HV traveling priority section, thus setting the travel plan, and the travel section 4 is set for the catalyst warm-up section. In the thus set travel plan, because the traveling load of the travel section 4 as the initial HV traveling priority section (predetermined section) is lower than or equal to the predetermined load, the travel plan and the catalyst warm-up section are not reset. Thus, it is possible to reduce the number of times the travel plan is reset (the processing load of the HVECU 70). Because the traveling load is lower than or equal to the predetermined load in the travel section 4, it is presumable that emissions are less likely to deteriorate if catalyst warm-up is carried out at the time when the vehicle travels in the travel section 4.

With the above-described hybrid vehicle 20 according to the embodiment, the travel plan is set by determining each of the travel sections in the travel route to the destination as one of the HV traveling priority section and the EV traveling priority section on the basis of the traveling load and the initial HV traveling priority section (predetermined section) is set for the catalyst warm-up section. When the traveling load of the predetermined section is higher than the predetermined load, the travel plan is reset by changing any one of the preceding travel sections (EV traveling priority sections) to the HV traveling priority section and the changed section is reset for the catalyst warm-up section. When the traveling load of the predetermined section is lower than or equal to the predetermined traveling load, the travel plan and the catalyst warm-up section are not reset. Therefore, it is possible to suppress deterioration of emissions, and it is possible to reduce the number of times the travel plan is reset (the processing load of the HVECU 70).

Figure 6:
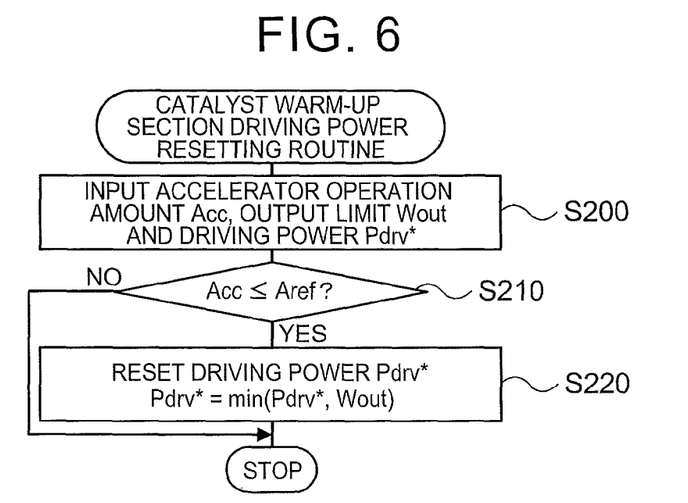
FIG. 6 is a flowchart that shows an example of a catalyst warm-up section driving power resetting routine that is executed by the HVECU according to the embodiment.

In the hybrid vehicle 20 according to the embodiment, although not specifically described, the driving power Pdrv* may be limited when the vehicle travels in the catalyst warm-up section. FIG. 6 is a flowchart that shows an example of a catalyst warm-up section driving power resetting routing that is executed by the HVECU 70 according to the embodiment. This routine is repeatedly executed when the vehicle travels in the catalyst warm-up section.

When the catalyst warm-up section driving power resetting routine is executed, the HVECU 70 initially inputs data, such as the accelerator operation amount Acc from the accelerator pedal position sensor 84, the output limit Wout of the battery 50 and the driving power Pdrv* (step S200). Here, for the output limit Wout of the battery 50, a value set on the basis of the state of charge SOC and the battery temperature Tb is input from the battery ECU 52 through communication. For the driving power Pdrv*, the above-described value that is set at the time when the vehicle travels in HV traveling, specifically, a value obtained by multiplying the required torque Tr* by the rotation speed Nr of the drive shaft 36, is input.

When the data are input in this way, the accelerator operation amount Acc is compared with a threshold Aref (step S210). Here, the threshold Aref is used to determine whether a driver requires rapid acceleration, and may be, for example, 85%, 90%, 95%, or the like.

When the accelerator operation amount Acc is smaller than or equal to the threshold Aref, it is determined that the driver does not require rapid acceleration, and resets the driving power Pdrv* while setting the upper limit of the driving power Pdrv*, input in step S200, to the output limit Wout of the battery 50 (step S220), after which the routine ends. Thus, when the purification catalyst 134a is not activated, it is possible to stop or interrupt catalyst warm-up (the operation of the engine 22 at the catalyst warm-up operation point), so it is possible to suppress deterioration of emissions.

When the accelerator operation amount Acc is larger than the threshold Aref, it is determined that the driver requires rapid acceleration, and the routine directly ends without resetting the driving power Pdrv*. Thus, it is possible to deal with driver's request for rapid acceleration.

With the above-described hybrid vehicle 20 according to an alternative embodiment, when the currently traveling travel section is the catalyst warm-up section, the driving power Pdrv* is basically limited to at or below the output limit Wout of the battery 50. Therefore, when the purification catalyst 134a is not activated, it is possible to suppress stop or interrupt catalyst warm-up (the operation of the engine 22 at the catalyst warm-up operation point), so it is possible to suppress deterioration of emissions. When the accelerator operation amount Acc is larger than the threshold Aref, the required power Pe* is not limited to at or below the output limit Wout of the battery 50, so it is possible to deal with driver's request for rapid acceleration.

In the hybrid vehicle 20 according to this alternative embodiment, in the case where the currently traveling travel section is the catalyst warm-up section, the driving power Pdrv* is limited to at or below the output limit Wout of the battery 50 when the accelerator operation amount Acc is smaller than or equal to the threshold Aref; whereas the driving power Pdrv* is not limited to at or below the output limit Wout of the battery 50 when the accelerator operation amount Acc is larger than the threshold Aref. Instead, the driving power Pdrv* may be limited to at or below the output limit Wout of the battery 50 irrespective of the accelerator operation amount Acc.

In the hybrid vehicle 20 according to the embodiment, in the case where the purification catalyst 134a is not activated while the vehicle is traveling in HV traveling, the catalyst warm-up power Pset is set for the required power Pe* when the driving power Pdrv* is lower than or equal to the output limit Wout of the battery 50; whereas the power (Pdrv*−Wout) is set for the required power Pe* when the driving power Pdrv* is higher than the output limit Wout of the battery 50. Instead, when the vehicle travels in the catalyst warm-up section, the output limit Wout of the battery 50 may be a value higher than a value (value based on the state of charge SOC and the battery temperature Tb) at the time when the vehicle travels in the other travel sections. Thus, when the purification catalyst 134a is not activated, it is possible to suppress stop and interruption of catalyst warm-up (the operation of the engine 22 at the catalyst warm-up operation point), so it is possible to suppress deterioration of emissions.

In the hybrid vehicle 20 according to the embodiment, in setting the travel plan (before resetting), for the travel sections having a traveling load lower than or equal to the predetermined load, travel sections until the total required energy of the EV traveling priority sections reaches the stored electric energy of the battery 50 are determined as the EV traveling priority sections in ascending order of a traveling load and the remaining travel sections are determined as the HV traveling priority sections. Instead, the travel sections until the total required energy of the EV traveling priority sections reaches the stored electric energy of the battery 50 may be determined as the EV traveling priority sections in descending order of a distance, and the remaining travel sections may be determined as the HV traveling priority sections. Alternatively, the travel sections that achieve a combination of a condition that the total required energy of the EV traveling priority sections is smaller than or equal to the stored electric energy of the battery 50 and a condition that the distance of the EV traveling priority sections is maximum may be determined as the EV traveling priority sections, and the travel sections not included in the travel sections that achieve the above combination may be determined as the HV traveling priority sections.

Figure 7:
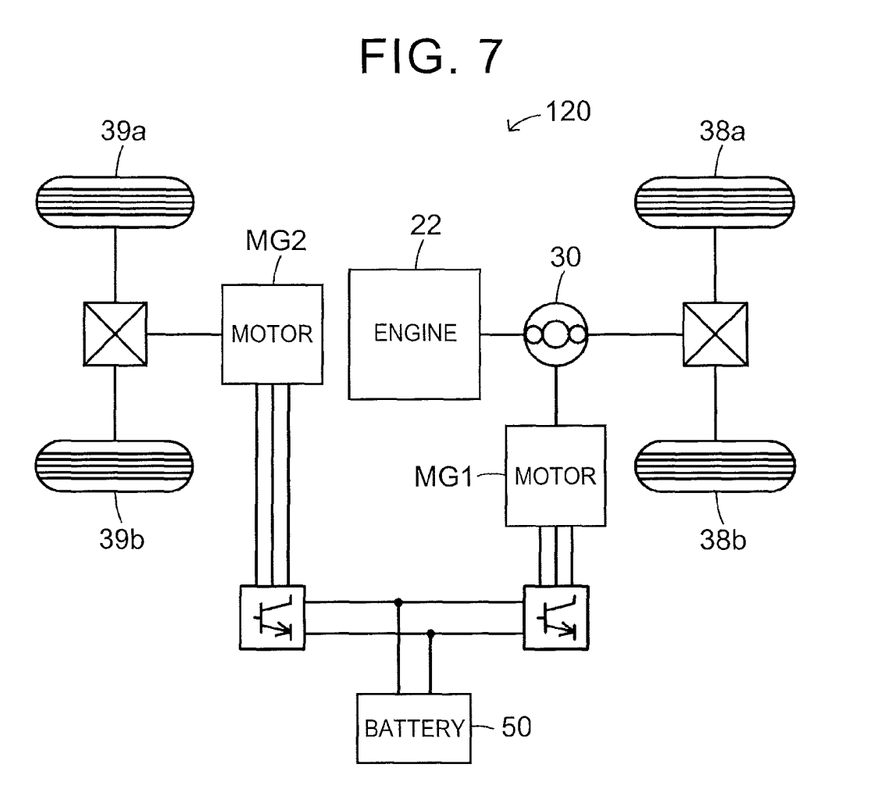
FIG. 7 is a configuration view that schematically shows the configuration of a hybrid vehicle according to an alternative embodiment.

In the hybrid vehicle 20 according to the embodiment, power from the motor MG2 is output to the drive shaft 36 connected to the drive wheels 38a, 38b. Instead, as illustrated in a hybrid vehicle 120 according to an alternative embodiment shown in FIG. 7, power from the motor MG2 may be output to an axle (axle connected to wheels 39a, 39b in FIG. 7) different from an axle (axle connected to the drive wheels 38a, 38b) to which the drive shaft 36 is connected.

Figure 8:
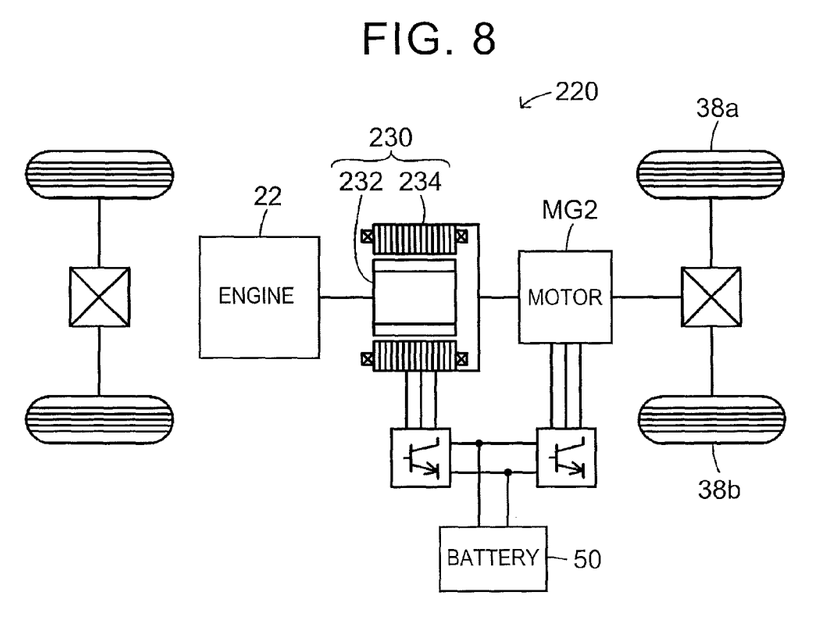
FIG. 8 is a configuration view that schematically shows the configuration of a hybrid vehicle according to an alternative embodiment.

In the hybrid vehicle 20 according to the embodiment, power from the engine 22 is output to the drive shaft 36 connected to the drive wheels 38a, 38b via the planetary gear unit 30. Instead, as illustrated in a hybrid vehicle 220 according to an alternative embodiment shown in FIG. 8, a twin rotor motor 230 may be provided. The twin rotor motor 230 includes an inner rotor 232 connected to the crankshaft of the engine 22 and an outer rotor 234 connected to the drive shaft 36 connected to the drive wheels 38a, 38b, transmits part of power from the engine 22 to the drive shaft 36 and converts the remaining power to electric power.

Figure 9:
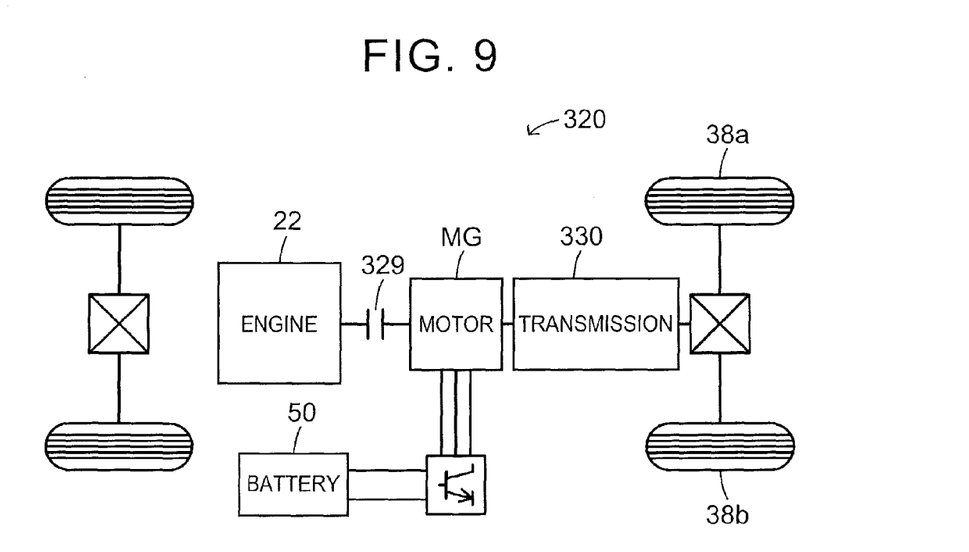
FIG. 9 is a configuration view that schematically shows the configuration of a hybrid vehicle according to an alternative embodiment.
Figure 10:
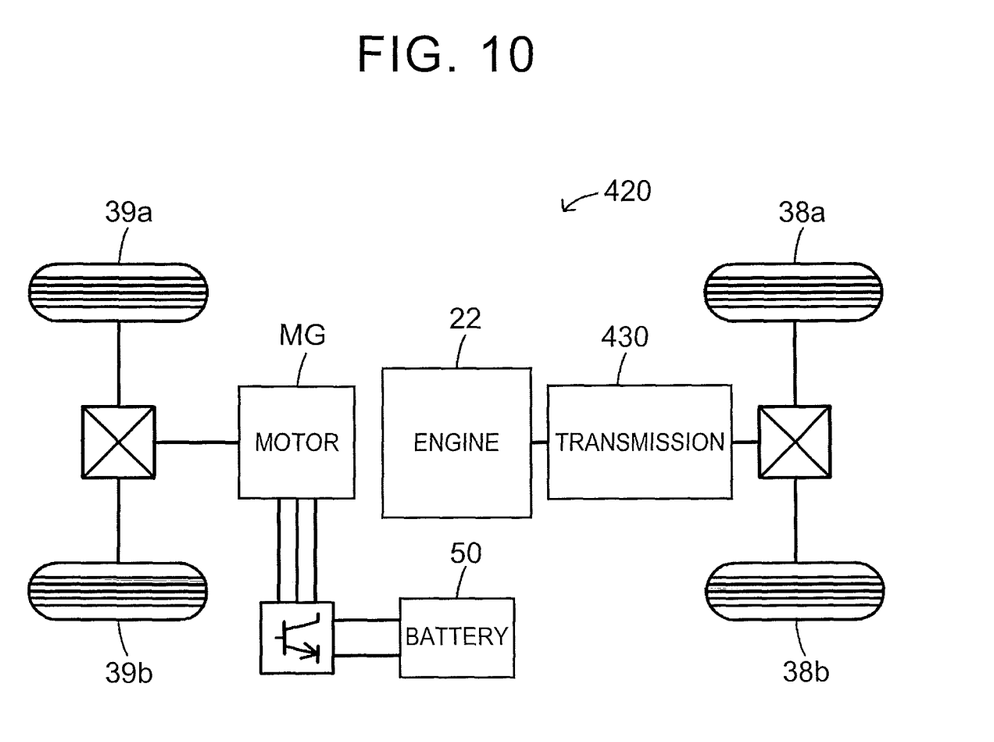
FIG. 10 is a configuration view that schematically shows the configuration of a hybrid vehicle according to an alternative embodiment.

In the hybrid vehicle 20 according to the embodiment, power from the engine 22 is output via the planetary gear unit 30 to the drive shaft 36 connected to the drive wheels 38a, 38b, and power from the motor MG2 is output to the drive shaft 36. Instead, as illustrated in a hybrid vehicle 320 according to an alternative embodiment shown in FIG. 9, a motor MG may be connected via a transmission 330 to the drive shaft 36 connected to the drive wheels 38a, 38b, the engine 22 may be connected to the rotary shaft of the motor MG via a clutch 329, power from the engine 22 may be output to the drive shaft 36 via the rotary shaft of the motor MG and the transmission 330, and power from the motor MG may be output to the drive shaft via the transmission 330. Alternatively, as illustrated in a hybrid vehicle 420 according to an alternative embodiment shown in FIG. 10, power from the engine 22 may be output via a transmission 430 to the drive shaft 36 connected to the drive wheels 38a, 38b, and power from the motor MG may be output to an axle (axle connected to the wheels 39a, 39b shown in FIG. 10) different from an axle connected to the drive wheels 38a, 38b.

The correspondence relationship between the major elements according to the embodiment and the major elements of the invention described in Summary of the Invention will be described. In the embodiment, the engine 22 corresponds to the "engine", the motor MG2 corresponds to the "motor", the battery 50 corresponds to the "battery", the navigation system 90 corresponds to the "navigation system", the HVECU 70 that executes the travel plan setting routine shown in FIG. 3 corresponds to "controller", the HVECU 70, the engine ECU 24 and the motor ECU 40 also correspond to "controller". In the travel plan setting routine, the HVECU 70 sets the travel plan by determining each of the travel sections in the travel route to the destination as one of the HV traveling priority section and the EV traveling priority section on the basis of the traveling load, sets the initial HV traveling priority section (predetermined section) for the catalyst warm-up section, resets the travel plan by changing any one of the preceding travel sections (EV traveling priority sections) to the HV traveling priority section and resets the changed section for the catalyst warm-up section when the traveling load of the predetermined section is higher than the predetermined load, and does not reset the travel plan or the catalyst warm-up section when the traveling load of the predetermined section is lower than or equal to the predetermined traveling load. The HVECU 70 sets the target rotation speed Ne* of the engine 22, the target torque Te* of the engine 22 and the torque commands Tm1*, Tm2* of the motors MG1, MG2 such that the vehicle travels in accordance with the travel plan, and transmits the set target rotation speed Ne*, target torque Te* and torque commands Tm1*, Tm2* to the engine ECU 24 and the motor ECU 40. The engine ECU 24 controls the engine 22 on the basis of the target rotation speed Ne* and the target torque Te* from the HVECU 70. The motor ECU 40 controls the motors MG1, MG2 on the basis of the torque commands Tm1*, Tm2* from the HVECU 70.

Here, the "engine" is not limited to the engine 22 that outputs power using gasoline, light oil, or the like, as fuel, and may be an engine of any type as long as the engine is able to output driving power and to which a purification device including a purification catalyst that purifies exhaust gas is installed in an exhaust system. The "motor" is not limited to the motor MG2 configured as the synchronous generator motor, and may be a motor of any type, such as an induction motor, as long as the motor is able to output driving power. The "battery" is not limited to the battery 50 configured as a lithium ion secondary battery, and may be a battery of any type, such as a nickel-metal hydride secondary battery and a nickel-cadmium secondary battery, as long as the battery is able to exchange electric power with the motor. The "navigation system" is not limited to the navigation system 90, and may be configured as a navigation system of any type as long as the navigation system sets a travel route to a destination and carries out route guidance. The "controller" is not limited to the one that sets the travel plan by determining each of the travel sections in the travel route to the destination as one of the HV traveling priority section and the EV traveling priority section on the basis of the traveling load, sets the initial HV traveling priority section (predetermined section) for the catalyst warm-up section, resets the travel plan by changing any one of the preceding travel sections (EV traveling priority sections) to the HV traveling priority section and resets the changed section for the catalyst warm-up section when the traveling load of the predetermined section is higher than the predetermined load, and does not reset the travel plan or the catalyst warm-up section when the traveling load of the predetermined section is lower than or equal to the predetermined traveling load. The "controller" may be any type as long as the "controller" sets the travel plan by determining each of the travel sections in the travel route to the destination, supplied from the navigation system, as one of the HV traveling priority section and the EV traveling priority section on the basis of a traveling load, sets the predetermined section that is the initial HV traveling priority section in the travel plan for the catalyst warm-up section, resets the travel plan by changing any one of the EV traveling priority sections before the predetermined section to the HV traveling priority section and resets the changed section for the catalyst warm-up section when the traveling load of the predetermined section is higher than the predetermined load corresponding to the output limit of the battery, and does not reset the travel plan or the catalyst warm-up section when the traveling load of the predetermined section is lower than or equal to the predetermined load. In the HV traveling priority section, HV traveling in which the vehicle travels while the engine is operated is carried out in preference to EV traveling in which the vehicle travels while the operation of the engine is stopped. In the EV traveling priority section, the EV traveling is carried out in preference to the HV traveling. The "controller" is not limited to the one that is configured as a combination of the HVECU 70, the engine ECU 24 and the motor ECU 40, and may be configured as a single electronic control unit. The "controller" is not limited to the one that controls the engine 22 and the motors MG1, MG2 by setting the target rotation speed Ne* and target torque Te* of the engine 22 and the torque commands Tm1*, Tm2* of the motors MG1, MG2. The "controller" may be any type as long as the "controller" controls the engine and the motor such that the purification catalyst is warmed up when the vehicle travels on driving power in accordance with the travel plan and travels in the catalyst warm-up section.

The correspondence relationship between the major elements according to the embodiment and the major elements of the invention described in Summary of the Invention does not limit the elements of the invention described in Summary of the Invention because the embodiment is one example for specifically explaining the embodiment of the invention described in Summary of the Invention. That is, the invention described in Summary of the Invention should be construed on the basis of the description in that section, and the embodiment is only one specific example of the invention described in Summary of the Invention.

The mode for carrying out the invention is described using the embodiment; however, the invention is not limited to the above embodiment, and, of course, various modifications are applicable without departing from the scope of the invention.

The invention is usable in, for example, manufacturing industries for a hybrid vehicle.

What is claimed is:

1. A hybrid vehicle comprising:
an engine configured to output driving power, the engine including a purification device having a purification catalyst that purifies exhaust gas, the purification device being installed in an exhaust system;
a motor configured to output driving power;
a battery configured to exchange electric power with the motor;
a navigation system configured to set a travel route to a destination and carry out route guidance; and
a controller configured to set a travel plan in which each of travel sections in the travel route to the destination, set by the navigation system, is determined as one of a hybrid traveling priority section and an electric traveling priority section on the basis of a traveling load, the hybrid traveling priority section being a section in which the hybrid vehicle travels while the engine is operated is carried out in preference to electric traveling in which the hybrid vehicle travels while operation of the engine is stopped, the electric traveling priority section being a section in which the electric traveling is carried out in preference to the hybrid traveling, the controller being configured to set a predetermined section, which is an initial section of the hybrid traveling priority section in the travel plan, for a warm-up section for warming up the purification device, the controller being configured to reset the travel plan by changing any one of the electric traveling priority sections before the predetermined section to the hybrid traveling priority section when the traveling load of the predetermined section is higher than a predetermined load corresponding to an output limit of the battery, the controller being configured to reset the section changed to the hybrid traveling priority section for the warm-up section for warming up the purification device, the controller being configured to keep the travel plan and the warm-up section of the purification device when the traveling load of the predetermined section is lower than or equal to the predetermined load, the controller being configured to control the engine and the motor such that the purification device is warmed up when the hybrid vehicle travels on the driving power and travels in the warm-up section for warming up the purification device in accordance with the set travel plan.

2. The hybrid vehicle according to claim 1, wherein
the controller is configured to limit the driving power to at or below the output limit of the battery when the hybrid vehicle travels in the warm-up section for warming up the purification device.

3. The hybrid vehicle according to claim 2, wherein
the controller is configured not to limit the driving power to at or below the output limit of the battery when an accelerator operation amount is larger than a predetermined operation amount while the hybrid vehicle travels in the warm-up section for warming up the purification device.

4. The hybrid vehicle according to claim 1, wherein
the controller is configured to determine the travel sections until a total energy of the electric traveling priority sections reaches a stored electric energy of the battery as the electric traveling priority sections in ascending order of a traveling load for the travel sections having the traveling load lower than or equal to the predetermined load among the travel sections in the travel route, the controller is configured to determine a remaining travel sections among the travel sections having the traveling load lower than or equal to the predetermined load as the hybrid traveling priority sections, and the controller is configured to determine the travel sections having the traveling load higher than the predetermined load as the hybrid traveling priority sections.

5. The hybrid vehicle according to claim 1, further comprising:
a generator; and
a planetary gear unit connected to a drive shaft coupled to an axle, an output shaft of the engine and a rotary shaft of the generator, wherein
the motor is connected to the drive shaft.

* * * * *